(12) United States Patent
De Weijer et al.

(10) Patent No.: US 9,393,734 B2
(45) Date of Patent: *Jul. 19, 2016

(54) POLYETHYLENE FILM WITH HIGH TENSILE STRENGTH AND HIGH TENSILE ENERGY TO BREAK

(75) Inventors: Anton Peter De Weijer, Nijmegen (NL); Hendrik Van De Hee, Ede (NL); Martinus Wilhelmus Maria Gemma Peters, Nijmegen (NL); Sanjay Rastogi, Eindhoven (NL); Bing Wang, Geleen (NL)

(73) Assignee: THIJIN ARAMID B.V., Arnhem (NL)

( * ) Notice: Subject to any disclaimer, the term of this patent is extended or adjusted under 35 U.S.C. 154(b) by 700 days.

This patent is subject to a terminal disclaimer.

(21) Appl. No.: 12/452,526

(22) PCT Filed: Jul. 2, 2008

(86) PCT No.: PCT/EP2008/005385
§ 371 (c)(1),
(2), (4) Date: Jan. 7, 2010

(87) PCT Pub. No.: WO2009/007045
PCT Pub. Date: Jan. 15, 2009

(65) Prior Publication Data
US 2010/0144224 A1    Jun. 10, 2010

(30) Foreign Application Priority Data
Jul. 9, 2007 (EP) ..................... 07013377

(51) Int. Cl.
B29C 55/02 (2006.01)
B29C 55/00 (2006.01)
B29C 55/04 (2006.01)
D07B 1/02 (2006.01)
B29K 23/00 (2006.01)

(52) U.S. Cl.
CPC ............. *B29C 55/005* (2013.01); *B29C 55/04* (2013.01); *D07B 1/025* (2013.01); *B29K 2023/0683* (2013.01); *D07B 2201/2003* (2013.01); *D07B 2201/2009* (2013.01); *D07B 2205/2014* (2013.01); *Y10T 428/249921* (2015.04); *Y10T 442/10* (2015.04)

(58) Field of Classification Search
CPC ............. B29C 55/04; B29C 55/005; B29K 2023/0683; D07B 1/025; D07B 2201/2003; D07B 2205/2014; D07B 2201/2009; Y10T 428/249921; Y10T 442/10
USPC ............................................. 442/1; 428/221
See application file for complete search history.

(56) References Cited

U.S. PATENT DOCUMENTS

| | | |
|---|---|---|
| 4,344,908 A | 8/1982 | Smith et al. |
| 4,953,234 A | 9/1990 | Li et al. |
| 5,004,778 A | 4/1991 | Waagen et al. |
| 5,106,555 A | 4/1992 | Kobayashi et al. |
| 5,106,558 A | 4/1992 | Kobayashi et al. |
| 5,167,876 A | 12/1992 | Lem et al. |
| 5,284,411 A | 2/1994 | Enomoto et al. |
| 5,503,791 A | 4/1996 | Fortuin et al. |
| 5,578,373 A | 11/1996 | Kobayashi et al. |
| 5,650,451 A | 7/1997 | Yagi et al. |
| 5,756,660 A | 5/1998 | Shiraishi et al. |
| 6,017,480 A | 1/2000 | Yoshida et al. |
| 6,265,504 B1 | 7/2001 | Liu et al. |
| 6,794,033 B2 | 9/2004 | Morin et al. |
| 6,863,976 B2 | 3/2005 | Morin et al. |
| 6,951,685 B1 | 10/2005 | Weedon et al. |
| 7,740,779 B2 | 6/2010 | Harding et al. |
| 7,964,266 B2 | 6/2011 | Harding et al. |
| 7,976,930 B2 | 7/2011 | Weedon et al. |
| 7,993,715 B2 | 8/2011 | Geva et al. |
| 8,197,935 B2 | 6/2012 | Bovenschen et al. |
| 2001/0053443 A1 | 12/2001 | Perez et al. |
| 2003/0127768 A1 | 7/2003 | Morin et al. |
| 2004/0267313 A1 | 12/2004 | Amery et al. |
| 2005/0091961 A1 | 5/2005 | Prickett |
| 2005/0121825 A1* | 6/2005 | Rastogi et al. ............... 264/237 |
| 2006/0142521 A1 | 6/2006 | Rastogi et al. |
| 2008/0251960 A1 | 10/2008 | Harding et al. |
| 2008/0287990 A1 | 11/2008 | Smit |
| 2011/0124835 A1 | 5/2011 | De Weijer et al. |
| 2011/0268951 A1 | 11/2011 | Eem Van Der et al. |
| 2011/0268952 A1 | 11/2011 | Eem Van Der et al. |

FOREIGN PATENT DOCUMENTS

| | | |
|---|---|---|
| EP | 0 231 547 A1 | 8/1987 |
| EP | 0 269 151 A1 | 6/1988 |

(Continued)

OTHER PUBLICATIONS

International Search Report issued in International Application No. PCT/EP2008/005385; Mailed Sep. 5, 2008.

(Continued)

*Primary Examiner* — Elizabeth M Cole
(74) *Attorney, Agent, or Firm* — Oliff PLC

(57) ABSTRACT

The present invention pertains to a UHMWPE film having a tensile strength of at least 2.0 GPa, a tensile energy to break of at least 30 J/g, an Mw of at least 500 000 gram/mole, and a Mw/Mn ratio of at most 6. The film may be manufactured via a process which comprises subjecting a starting UHMWPE with a weight average molecular weight of at least 500 000 gram/mole, an elastic shear modulus determined directly after melting at 160° C. of at most 0.9 MPa, and a Mw/Mn ratio of at most 6 to a compacting step and a stretching step under such conditions that at no point during the processing of the polymer its temperature is raised to a value above its melting point. The film may be used as starting material in any applications where high tensile strength and high energy to break are important. Suitable applications include ballistic applications, ropes, cables, nets, fabrics, and protective applications.

10 Claims, No Drawings

(56) References Cited

FOREIGN PATENT DOCUMENTS

| EP | 0 292 074 A1 | 11/1988 |
|---|---|---|
| EP | 0 374 785 A1 | 6/1990 |
| EP | 0 874 005 A1 | 10/1998 |
| EP | 0 833 742 B1 | 9/2002 |
| EP | 1 627 719 A1 | 2/2006 |
| EP | 1 746 187 A1 | 1/2007 |
| EP | 2 014 445 A1 | 1/2009 |
| JP | A-06-010254 | 1/1994 |
| JP | A-8-26487 | 1/1996 |
| JP | A-2002-180324 | 6/2002 |
| WO | WO 86/05739 A1 | 10/1986 |
| WO | WO 91/12136 A1 | 8/1991 |
| WO | WO 97/00766 A1 | 1/1997 |
| WO | WO 01/21668 A1 | 3/2001 |
| WO | WO 2004/113057 A1 | 12/2004 |
| WO | WO 2006/107197 A1 | 10/2006 |
| WO | WO 2009/007045 A1 | 1/2009 |

OTHER PUBLICATIONS

Mitani, M., et al., "Unprecedented Living Olefin Polymerization Derived from an Attractive Interaction between a Ligand and a Growing Polymer Chain," Chem. Eur. J., 2003, pp. 2396-2403, vol. 9.
Wang, L., et al., "Rolling and Roll-Drawing of Ultrahigh Molecular Weight Polyethylene Reactor Powders," Journal of Applied Polymer Science, Oct. 20, 1991, pp. 1559-1564, vol. 43.
Ihara et al., "Single site polymerization of ethylene and 1-olefins initiated by rare earth metal complexes," Macromol. Chem. Phys., vol. 197, pp. 1909-1917, 1996, Hüthig & Wepf Verlag, Zug.
Sep. 29, 2009 International Search Report issued in PCT/EP2009/058992.
Sep. 29, 2009 Written Opinion issued in PCT/EP2009/058992.
U.S. Appl. No. 13/054,618 filed in the name of Soon Joo Bovenschen et al. on Jul. 14, 2009.
U.S. Appl. No. 13/467,729 filed in the name of Soon Joo Bovenschen et al. on May 9, 2012.
Office Action issued Oct. 20, 2011 in U.S. Appl. No. 13/054,618.
Lippits, "Controlling the melting kinetics of polymers; a route to a new melt state," Eindhoven University of Technology, ISBN 978-90-386-0895-2, Mar. 6, 2007.
Rastogi et al., "Heterogeneity in polymer melts from melting of polymer crystals," Nature Materials, vol. 4, pp. 635-641, Aug. 2005.
van der Werff et al., "Tensile deformation of high strength and high modulus polyethylene fibers," Colloid Polymer Science, vol. 269, pp. 747-763, 1991.
Oct. 5, 2009 International Search Report and Written Opinion issued in International Application No. PCT/EP2009/058641.
Mar. 16, 2010 International Search Report and Written Opinion issued in International Application No. PCT/EP2010/050063.
Jul. 2, 2010 International Search Report and Written Opinion issued in International Application No. PCT/EP2010/050065.
Feb. 5, 2009 European Search Report issued in European Application No. 08160053.8.
Feb. 5, 2013 Office Action issued in U.S. Appl. No. 13/467,729.
Third Party Submission dated Oct. 5, 2012 from Japanese Patent Application No. 2011-517906.
U.S. Office Action dated Nov. 7, 2013 from U.S. Appl. No. 13/143,744.
Research Disclosure, RD 326076, published Jun. 10, 1991.
U.S. Office Action dated Oct. 9, 2013 from U.S. Appl. No. 13/003,361.
Feb. 23, 2015 Office Action issued in U.S. Appl. No. 13/144,038.
Jun. 8, 2015 Office Action issued in U.S. Appl. No. 13/144,038.
Jog; "Solid State Processing of Polymers: A Review;" Advances in Polymer Technology; 1993; pp. 281-289; vol. 12, No. 3.

* cited by examiner

POLYETHYLENE FILM WITH HIGH TENSILE STRENGTH AND HIGH TENSILE ENERGY TO BREAK

This application is a 371 of PCT/EP2008/005385.

The present invention pertains to a polyethylene film with high tensile strength and high tensile energy to break, and to a method for manufacturing such a film from a specific ultra high molecular weight polyethylene. In this document ultra high molecular weight polyethylene will further be indicated as UHMWPE.

Methods for manufacturing high-strength high-modulus UHMWPE films are known in the art.

U.S. Pat. No. 5,756,660 describes polymerisation of UHMWPE over a specific catalyst, followed by compression moulding, rolling and stretching to form a polymer film. In example 1, a material is obtained with a modulus of 160 GPa and a strength of 2.8 GPa.

U.S. Pat. No. 5,106,555 describes a method for compression molding/stretching of UHMWPE.

U.S. Pat. No. 5,503,791 describes a polyethylene film manufactured by extruding a solution of a polyolefin in a first solvent, followed by cooling, the removal of the solvent and stretching of the film. A disadvantage of the thus obtained film is that it always contains a certain amount of residual solvent, which may detrimentally affect the properties of the film. In general the amount of solvent present in solution of gel-cast films is at least 100 ppm. Further, the recovery of solvent is highly uneconomic.

EP 292 074 describes a UHMWPE film having a molecular weight of 4,000,000 g/mol, a Mw/Mn ratio of 4, a tensile strength of 2.3 GPa, and a tensile modulus of 92 GPa. Assuming a density of 0.97 g/ml, a tensile energy to break of 29.6 J/g can be calculated.

EP 269 151 describes a material having a tensile strength above 2.0 GPa, a modulus above 70 GPa. and a creep below $3*10^{-7}$ sec$^{-1}$. This reference contains no information on the Mw/Mn ratio of the final product.

U.S. Pat. No. 5,106,558 describes a method for the continuous preparation of a polyethylene having high strength and high modulus which comprises the steps of mixing 100 parts by weight of an ultra-high molecular weight polyethylene powder having an intrinsic viscosity of 5-50 dl/g in decalin at 135° C. with 2-50 parts of a liquid organic compound having a boiling point higher than the melting point of polyethylene, feeding the resulting mixture between a pair of rollers, and subjecting the mixture to compression moulding and drawing. This reference contains no information on the Mw/Mn ratio of the final product.

U.S. Pat. No. 6,017,480 describes a process for producing polyolefin materials comprising the steps of preparing a molded article of UHMW polyolefin, stretching the article by more than 30-fold, contacting the article, and restreching the article. This reference contains no information on the Mw/Mn ratio of the final product.

It has been found that there is still room for improvement in the field of high-tensile strength UHMWPE films. More in particular, there are numerous applications, including ballistic applications, ropes, cables, and nets, fabrics, and protective applications where PE films with high tensile energy to break, a high tensile strength, and other desirable properties will find application. The present invention provides such a UHMWPE film.

The UHMWPE film according to the present invention has a tensile strength of at least 2.0 GPa, a tensile energy to break of at least 30 J/g, an Mw of at least 500 000 gram/mole, and a Mw/Mn ratio of at most 6.

It has been found that the selection of a material with a Mw/Mn ratio of at most 6 in combination with a Mw of at least 500 000 is of importance to allow the final film to have the described high tensile strength and high energy to break in combination with further desirable properties, as will be discussed below. The materials described in U.S. Pat. No. 5,756,660, U.S. Pat. No. 5,106,555, and U.S. Pat. No. 5,503,791 do not meet all of the above criteria.

As indicated above, the UHMWPE film according to the invention has a tensile strength of at least 2.0 GPa, determined in accordance with ASTM D882-00. Depending on the stretching ratio and stretching temperature, tensile strengths may be obtained of at least 2.5 GPA, in particular at least 3.0 GPa, more in particular at least 3.5 GPa. Tensile strengths of at least 4 GPa may also be obtained.

The tensile energy to break of the UHMWPE film according to the invention is at least 30 J/g. The tensile energy to break is determined in accordance with ASTM D882-00 using a strain rate of 50%/min. It is calculated by integrating the energy per unit mass under the stress-strain curve.

The tensile energy to break may be approximated by the following methods. These will give a fair approximation of the tensile energy to break as it is to be determined in accordance with ASTM D882-00 as discussed above.

An approximation of the tensile energy to break may be obtained by integrating the total energy absorbed and dividing it by the mass of the original gage region of the specimen. In particular, since the stress-strain curve of UHMWPE samples with a tenacity over 2.0 GPa is approximately a straight line, the tensile energy to break can be calculated by the following formula $$TEB = \frac{\sigma}{\rho} * \frac{EAB}{2} * 10$$

in which sigma is the tensile strength in GPa according to ASTM D882-00, rho is density in g/cm3, EAB is the elongation at break, expressed as a percentage according to ASTM D882-00, and TEB is the tensile energy to break in J/g.

Another approximation of the tensile energy to break TEB can be derived from tensile modulus and tensile strength in accordance with the following formula;

$$TEB = \frac{\sigma^2}{2 * \text{Modulus} * \rho} * 10^3$$

Depending on the stretching ratio, films may be obtained according to the invention which have a tensile energy to break of at least 35 J/g, in particular at least 40 J/g, more in particular at least 50 J/g.

The weight average molecular weight (Mw) of the polymer in the UHMWPE film of the present invention is at least 500 000 gram/mole in particular between $1.10^6$ gram/mole and $1.10^8$ gram/mole. The molecular weight distribution and molecular weigh averages (Mw, Mn, Mz) of the polymer are determined in accordance with ASTM D 6474-99 at a temperature of 160° C. using 1,2,4-trichlorobenzene (TCB) as solvent. Appropriate chromatographic equipment (PL-GPC220 from Polymer Laboratories) including a high temperature sample preparation device (PL-SP260) may be used. The system is calibrated using sixteen polystyrene standards (Mw/Mn<1.1) in the molecular weight range $5*10^3$ to $8*10^6$ gram/mole.

The molecular weight distribution of the UHMWPE present in the film according to the invention is relatively narrow. This is expressed by the Mw (weight average molecular weight) over Mn (number average molecular weight) ratio of at most 6. More in particular the Mw/Mn ratio is at most 4, still more in particular at most 3, even more in particular at most 2.

The modulus of the UHMWPE film according to the invention is generally at least 80 GPa. The modulus is determined in accordance with ASTM D822-00. Depending on the stretching ratio, moduli may be obtained of at least 100, more in particular at least 120 GPa. It is possible to obtain moduli of at least 140 GPa, or at least 150 GPa.

In one embodiment of the present invention, the film according to the invention is characterised by a specific value for the uniplanar orientation parameter $\Phi$. The uniplanar orientation parameter $\Phi$ is defined as the ratio between the 200 and the 110 peak areas in the X-ray diffraction (XRD) pattern of the film sample as determined in reflection geometry.

Wide angle X-ray scattering (WAXS) is a technique that provides information on the crystalline structure of matter. The technique specifically refers to the analysis of Bragg peaks scattered at wide angles. Bragg peaks result from long-range structural order. A WAXS measurement produces a diffraction pattern, i.e. intensity as function of the diffraction angle $2\theta$ (this is the angle between the diffracted beam and the primary beam).

The uniplanar orientation parameter gives information about the extent of orientation of the 200 and 110 crystal planes with respect to the film surface. For a film sample with a high uniplanar orientation the 200 crystal planes are highly oriented parallel to the film surface. It has been found that the high tensile strength and high tensile energy to break of the film according to the invention are generally accompanied by a high uniplanar orientation. The ratio between the 200 and 110 peak areas for a specimen with randomly oriented crystallites is around 0.4. However, the crystallites with indices 200 are preferentially oriented parallel to the film surface according to the invention, resulting in a higher value of the 200/110 peak area ratio and therefore in a higher value of the uniplanar orientation parameter.

The value for the uniplanar orientation parameter may be determined using an X-ray diffractometer. A Bruker-AXS D8 diffractometer equipped with focusing multilayer X-ray optics (Göbel mirror) producing Cu-K$\alpha$ radiation (K wavelength=1.5418 Å) is suitable. Measuring conditions: 2 mm anti-scatter slit, 0.2 mm detector slit and generator setting 40 kV, 35 mA. The film specimen is mounted on a sample holder, e.g. with some double-sided mounting tape. The preferred dimensions of the film sample are 15 mm×15 mm (l×w). Care should be taken that the sample is kept perfectly flat and aligned to the sample holder. The sample holder with the film specimen is subsequently placed into the D8 diffractometer in reflection geometry (with the normal of the film perpendicular to the goniometer and perpendicular to the sample holder). The scan range for the diffraction pattern is from 5° to 40° ($2\theta$) with a step size of 0.02° ($2\theta$) and a counting time of 2 seconds per step. During the measurement the sample holder spins with 15 revolutions per minute around the normal of the film, so that no further sample alignment is necessary. Subsequently the intensity is measured as function of the diffraction angle $2\theta$. The peak area of the 200 and 110 reflections is determined using standard profile fitting software, e.g. Topas from Bruker-AXS. As the 200 and 110 reflections are single peaks, the fitting process is straightforward and it is within the scope of the skilled person to select and carry out an appropriate fitting procedure. The uniplanar orientation parameter is defined as the ratio between the 200 and 110 peak areas. This parameter is a quantitative measure of the uniplanar orientation.

The high uniplanar orientation parameter is also related to the Mw/Mn ratio, in that polymers with a Mw/Mn ratio within the range specified in the present invention can be converted into films with a desirable value for the uniplanar orientation parameter. As indicated above, in one embodiment, the film according to the invention has a uniplanar orientation parameter of at least 3. It may be preferred for this value to be at least 4, more in particular at least 5, or at least 7. Higher values, such as values of at least 10 or even at least 15 may also be obtained. The theoretical maximum value for this parameter may be as high as infinite if the peak area 110 equals zero. High values for the uniplanar orientation parameter are often accompanied by high values for the strength and the energy to break.

The UHMWPE film according to the invention may be manufactured by a process which comprises subjecting a starting UHMWPE with a weight average molecular weight of at least 500 000 gram/mole, an elastic shear modulus $G_N^0$, determined directly after melting at 160° C. of at most 0.9 MPa, and a Mw/Mn ratio of at most 6 to a compacting step and a stretching step under such conditions that at no point during the processing of the polymer its temperature is raised to a value above its melting point.

The starting material of the process according to the invention is a highly disentangled UHMWPE. This can be seen from the combination of the weight average molecular weight, the Mw/Mn ratio, and the elastic shear modulus.

For further elucidation and preferred embodiments as regards the molecular weight and the Mw/Mn ratio of the starting UHMWPE, reference is made to what has been stated above for the film according to the invention.

As indicated above, the starting UHMWPE has an elastic shear modulus $G_N^0$ determined directly after melting at 160° C. of at most 0.9 MPa, in particular at most 0.8 MPa, more in particular at most 0.7. The wording "directly after melting" means that the elastic shear modulus is determined as soon as the polymer has melted, in particular within 15 seconds after the polymer has melted. For this polymer melt $G_N^0$ typically increases from 0.6 to 2.0 MPa in several hours. The elastic shear modulus directly after melting at 160° C. is one of the characterising features of the very disentangled UHMWPE used in the present invention.

$G_N^0$ is the elastic shear modulus in the rubbery plateau region. It is related to the average molecular weight between entanglements Me, which in turn is inversely proportional to the entanglement density. In a thermodynamically stable melt having a homogeneous distribution of entanglements, Me can be calculated from $G_N^0$ via the formula $G_N^0 = g_N \rho RT/M_e$, where $g_N$ is a numerical factor set at 1, rho is the density in g/cm3, R is the gas constant and T is the absolute temperature in K.

A low elastic shear modulus thus stands for long stretches of polymer between entanglements, and thus for a low degree of entanglement.

The UHMWPE used in the process according to the invention preferably has a DSC crystallinity of at least 74%, more in particular at least 80%. The morphology of the films may be characterised using differential scanning calorimetry (DSC), for example on a Perkin Elmer DSC7. Thus, a sample of known weight (2 mg) is heated from 30 to 180° C. at 10° C. per minute, held at 180° C. for 5 minutes, then cooled at 10° C. per minute. The results of the DSC scan may be plotted as a graph of heat flow (mW or mJ/s; y-axis) against temperature (x-axis). The crystallinity is measured using the data from the heating portion of the scan. An enthalpy of fusion H (in J/g) for the crystalline melt transition is calculated by determining the area under the graph from the temperature determined just below the start of the main melt transition (endotherm) to the temperature just above the point where fusion is observed to be completed. The calculated H is then compared to the theoretical enthalpy of fusion ($H_c$ of 293 J/g) determined for 100% crystalline PE at a melt temperature of approximately 140° C. A DSC crystallinity index is expressed as the percentage 100($H/H_c$).

The film in accordance with the invention and the intermediate products of the manufacturing process according to the invention preferably also have crystallinities as indicated above.

The UHMWPE used in the present invention may have a bulk density which is significantly lower than the bulk density of conventional UWMWPEs. More in particular, the UHMWPE used in the process according to the invention may have a bulk density below 0.25 g/cm$^3$, in particular below 0.18 g/cm$^3$, still more in particular below 0.13 g/cm$^3$. The bulk density is determined as follows. A sample of UHMWPE powder is poured into a measuring beaker of exact 100 ml. After scraping away the surplus of material, the weight of the content of the beaker is determined and the bulk density is calculated.

The UHMWPE used in the process according to the invention can be a homopolymer of ethylene or a copolymer of ethylene with a co-monomer which is another alpha-olefin or a cyclic olefin both with generally between 3 and 20 carbon atoms. Examples include propene, 1-butene, 1-pentene, 1-hexene, 1-heptene, 1-octene, cyclohexene, etc. The use of dienes with up to 20 carbon atoms is also possible, e.g., butadiene or 1-4 hexadiene. The amount of (non-ethylene) alpha-olefin in the ethylene homopolymer or copolymer used in the process according to the invention preferably is at most 10 mole %, preferably at most 5 mole %, more preferably at most 1 mole %. If a (non-ethylene) alpha-olefin is used, it is generally present in an amount of at least 0.001 mol. %, in particular at least 0.01 mole %, still more in particular at least 0.1 mole %. Obviously, the ranges given above for the starting material also apply to the final polymer film.

The starting polymer for use in the present invention may be manufactured by a polymerisation process wherein ethylene, optionally in the presence of other monomers as discussed above, is polymerised in the presence of a single-site polymerisation catalyst at a temperature below the crystallisation temperature of the polymer, so that the polymer crystallises immediately upon formation. In particular, reaction conditions are selected such that the polymerisation speed is lower than the crystallisation speed. These synthesis conditions force the molecular chains to crystallize immediately upon their formation, leading to a rather unique morphology which differs substantially from the one obtained from the solution or the melt. The crystalline morphology created at the surface of a catalyst will highly depend on the ratio between the crystallization rate and the growth rate of the polymer. Moreover, the temperature of the synthesis, which is in this particular case also crystallization temperature, will strongly influence the morphology of the obtained UHMW-PE powder. In one embodiment the reaction temperature is between −50 and +50° C., more in particular between −15 and +30° C. It is well within the scope of the skilled person to determine via routine trial and error which reaction temperature is appropriate in combination with which type of catalyst, polymer concentrations and other parameters influencing the reaction.

To obtain a highly disentangled UHMWPE it is important that the polymerisation sites are sufficiently far removed from each other to prevent entangling of the polymer chains during synthesis. This can be done using a single-site catalyst which is dispersed homogenously through the crystallisation medium in low concentrations. More in particular, concentrations less than 1.10-4 mol catalyst per liter, in particular less than 1.10-5 mol catalyst per liter reaction medium may be appropriate. Supported single site catalyst may also be used, as long as care is taken that the active sites are sufficiently far removed from each other to prevent substantial entanglement of the polymers during formation.

Suitable methods for manufacturing starting UHMWPE used in the present invention are known in the art. Reference is made, for example to WO01/21668 and US20060142521.

The polymer is provided in particulate form, for example in the form of a powder, or in any other suitable particulate form. Suitable particles have a particle size of op to 5000 micron, preferably up to 2000 micron, more in particular up to 1000 micron. The particles preferably have a particle size of at least 1 micron, more in particular at least 10 micron.

The particle size distribution may be determined by laser diffraction (PSD, Sympatec Quixel) as follows. The sample is dispersed into surfactant-containing water and treated ultrasonic for 30 seconds to remove agglomerates/entanglements. The sample is pumped through a laser beam and the scattered light is detected. The amount of light diffraction is a measure for the particle size.

The compacting step is carried out to integrate the polymer particles into a single object, e.g., in the form of a mother sheet. The stretching step is carried out to provide orientation to the polymer and manufacture the final product. The two steps are carried out at a direction perpendicular to each other. It is noted that it is within the scope of the present invention to combine these elements in a single step, or to carry out the process in different steps, each step performing one or more of the compacting and stretching elements. For example, in one embodiment of the process according to the invention, the process comprises the steps of compacting the polymer powder to form a mothersheet, rolling the plate to form rolled mothersheet and subjecting the rolled mothersheet to a stretching step to form a polymer film.

The compacting force applied in the process according to the invention generally is 10-10000 N/cm$^2$, in particular 50-5000 N/cm2, more in particular 100-2000 N/cm$^2$. The density of the material after compacting is generally between 0.8 and 1 kg/dm$^3$, in particular between 0.9 and 1 kg/dm$^3$.

In the process according to the invention the compacting and rolling step is generally carried out at a temperature of at least 1° C. below the unconstrained melting point of the polymer, in particular at least 3° C. below the unconstrained melting point of the polymer, still more in particular at least 5° C. below the unconstrained melting point of the polymer. Generally, the compacting step is carried out at a temperature of at most 40° C. below the unconstrained melting point of the polymer, in particular at most 30° C. below the unconstrained melting point of the polymer, more in particular at most 10° C.

In the process according to the invention the stretching step is generally carried out at a temperature of at least 1° C. below the melting point of the polymer under process conditions, in particular at least 3° C. below the melting point of the polymer under process conditions, still more in particular at least 5° C. below the melting point of the polymer under process conditions. As the skilled person is aware, the melting point of polymers may depend upon the constraint under which they are put. This means that the melting temperature under process conditions may vary from case to case. It can easily be determined as the temperature at which the stress tension in the process drops sharply. Generally, the stretching step is carried out at a temperature of at most 30° C. below the melting point of the polymer under process conditions, in particular at most 20° C. below the melting point of the polymer under process conditions, more in particular at most 15° C.

The unconstrained melting temperature of the starting polymer is between 138 and 142° C. and can easily be determined by the person skilled in the art. With the values indicated above this allows calculation of the appropriate operating temperature. The unconstrained melting point may be determined via DSC (differential scanning calorimetry) in nitrogen, over a temperature range of +30 to +180° C. and with an increasing temperature rate of 10° C./minute. The maximum of the largest endothermic peak at from 80 to 170° C. is evaluated here as the melting point.

In the conventional processing of UHMWPE it was necessary to carry out the process at a temperature which was very close to the melting temperature of the polymer, e.g., within 1 to 3 degrees therefrom. It has been found that the selection of the specific starting UHMWPE used in the process according to the invention makes it possible to operate at values which are more below the melting temperature of the polymer than has been possible in the prior art. This makes for a larger temperature operating window which makes for better process control.

Conventional apparatus may be used to carry out the compacting step. Suitable apparatus include heated rolls, endless belts, etc.

The stretching step in the process according to the invention is carried out to manufacture the polymer film. The stretching step may be carried out in one or more steps in a manner conventional in the art. A suitable manner includes leading the film in one or more steps over a set of rolls both rolling in process direction wherein the second roll rolls faster that the first roll. Stretching can take place over a hot plate or in an air circulation oven. In general it is difficult to control the temperature of this type of equipment within 1 degree, which will allow the skilled person to appreciate the broadened operating window provided by the process of the present invention.

It is one of the features of the present invention that the total stretching ratio of the film can be very high indeed. For example, the total stretching ratio may be at least 120, in particular at least 140, more in particular at least 160. The total draw ratio is defined as the area of the cross-section of the compacted mothersheet divided by the cross-section of the drawn film produced from this mothersheet.

The process according to the invention is carried out in the solid state. The final polymer film has a polymer solvent content of less than 0.05 wt. %, in particular less than 0.025 wt. %, more in particular less than 0.01 wt. %.

The film according to the invention is a three-dimensional object which is characterised in that two of its dimensions are substantially larger than the third. More in particular, the ratio between the second smallest dimension, the width of the film, and the smallest dimension, the thickness of the film, is at least 10, in particular at least 50.

The polymer film or the converted products thereof according to the invention can be used as starting material for numerous applications, including ballistic applications, ropes, cables, nets, fabrics, and protective applications.

Ballistic attributes, ropes, cables, nets, fabrics, and protective appliances derived form the UHMWPE film according to the invention are also part of the present invention.

The present invention will be illustrated by way of the following examples. It is to be understood that the invention is not limited in any way thereto or thereby.

EXPERIMENTAL

Compaction is executed in a mould with dimensions 610× 30 mm. After the mould is filled with the polymer, the polymer is compacted in a hot press for several minutes. After cooling down to a temperature <40° C. the sheet is removed from the mould. Subsequently, the sheet is fed to a pair of upper and lower heated rolls. The distance between the rolls is 150 micron. Directly after rolling, the film was stretched over the surface of the upper roll. Further stretching of the rolled film was executed on an oil-heated hotplate located between two roller sets that run on accurately defined speeds.

Example 1

Polymerization

All air- and/or water-sensitive activities were performed under an argon atmosphere using Schlenk techniques or in a conventional nitrogen-filled glove box (Braun MB-150 GI). Methylalumoxane was purchased from WITCO GmbH as a 10 wt % toluene solution. Ethylene was obtained from Air Liquide. Dried toluene was used as the polymerization solvent. The catalyst [3-tBu-2-O—C8H3CH=N(C6F 5)]2TiCl2 was synthesized according to Mitani et al. (M. Mitani, T. Nakano, T. Fujita, Chem. Eur. J. 2003, 9, 2396-2403) and EP0874005. The molecular weight and molecular weight distribution was measured at 135° C. by gel-permeation chromatography (GPC; GPC220, Polymer Labs) using 1,2,4-trichlorobenzene as solvent. The polymerizations were carried out under atmospheric pressure using a 2000 ml round bottom flask, equipped with a thermocouple and a mechanical stirrer. Toluene (1000 ml) was introduced to the argon-purged reactor after which the solvent was saturated by bubbling ethylene into the solution for 30 minutes at +10° C. The polymerization was initiated by addition of a toluene solution of methylalumoxane (20 ml) after which a toluene solution of the catalyst (1 μmol) was introduced into the reactor while stirring vigorously. After 30 minutes the ethylene feed was stopped and isobutyl alcohol was added to terminate the polymerization. HCl and water were added to the resulting mixture. The solid UHMWPE was recovered by filtration, washed with water and acetone and dried (vacuum oven 60° C., overnight). The yield was 75 grams. Its weight and number average molecular weight was 3 600 000 and 2 300 000, respectively. The Mw/Mn ratio was 1.56. The bulk density was 0.11 g/cm$^3$. The unconstrained melting temperature of the polymer was 141° C. The elastic shear modulus determined directly after melting at 160° C. was 0.65 MPa.

16 gram disentangled ultrahigh molecular weight polyethylene (as synthesized above) was compacted at an average pressure of 160 bar at a maximum temperature of 115° C. maintained for 6 minutes. The resulted sheet was 0.9 mm thick, 610 mm long and 30 mm wide. Its density was 0.95 g/cm$^3$. The sheet was pre-heated to 125° C. and directly rolled and stretched into a film according to the above-mentioned procedure. Based on the dimensional changes, the rolling ratio was calculated as 4.5, the ratio of elongation of the integrated rolling/stretching process was 20. The surface temperature of the roller-set was 125° C. A number of experiments were carried out in which one, two, or three stretching steps were carried out, at different temperatures and stretching ratios. The stretching speed was adjusted so that the temperature and stretching ratios could be obtained. The number of stretching steps, the temperature of the stretching steps and the total stretching ratio, which includes the rolling step, are given in table 1. The mechanical properties, Uniplanar Orientation Parameter and DSC results of the films thus obtained are given in Table 1.

As can be seen from Table 1, the process according to the invention allows the manufacture of films with a high strength in combination with a high tensile energy to break. These films also show a high tensile modulus.

There is a positive correlation between the DSC crystallinity and the physical properties of the film, in that films with a higher crystallinity often have a higher strength and TEB.

The uniplanar orientation parameter is a measure for the alignment of the polymers in the film, and therewith related to the total stretching ratio. With the present invention, a uniplanar orientation parameter of above 3 can already be obtained at stretching ratio's of the order of 80. As will be illustrated in the comparative Example below, where a conventional polymer is used as starting material, a uniplanar orientation parameter of the order of 3 can only be obtained at very high stretching ratios, and there it will not be accompanied by the high strength and high TEB values that are part of the present invention.

Comparative Example 1

20 gram powder of a conventional Ziegler-Natta ultrahigh molecular weight polyethylene (Ticona GUR series UHM-WPE) having a Mw of about 2 600 000, an Mn of about 360 000, an Mw/Mn ratio of 7.22, a bulk density of 0.25 g/cm$^3$, and an elastic shear modulus determined directly after melting at 160° C. of 1.65 MPa was used as starting material. The starting polymer was compacted at an average pressure of 160 bar at a maximum temperature of 134° C. maintained for 6 minutes. The resulted sheet was 1.15 mm thick, 610 mm long and 30 mm wide. Its density was 0.95 g/cm$^3$. The sheet was pre-heated to 135° C. and directly rolled and stretched into a film according to the above-mentioned procedure. Based on the dimensional changes the rolling ratio was calculated as 4, the ratio of elongation of the integrated rolling/stretching process was around 20. The surface temperature of the roller-set was 138° C. A number of experiments were carried out in which one, two, or three stretching steps were carried out, at different temperatures and stretching ratios. The stretching speed was adjusted so that the temperature and stretching ratios could be obtained. The number of stretching steps, the temperature of the stretching steps and the total stretching ratio, which includes the rolling step, are given in table 2. The mechanical properties, Uniplanar Orientation Parameter and DSC results of the films thus obtained are given in Table 2

TABLE 1

| Stretched Sample | Stretching steps | Temp. at second (third) drawing (° C.) | Total Stretching Ratio | Tensile Strength (GPa) | Tensile Modulus (GPa) | TEB (J/g) | Heat of Fusion (J/g) | DSC crystallinity (%) | Uniplanar Orientation Parameter $\Phi$ ( ) | Unconstrained melting temperature (° C.) |
|---|---|---|---|---|---|---|---|---|---|---|
| E1 | 2 | 132 | 79 | 2.34 | 94 | 42.3 | 259 | 88.2% | 3.7 | 153 |
| E2 | 2 | 132 | 79 | 2.40 | 92 | 40.4 | 252 | 85.8% | 3.0 | 151 |
| E3 | 2 | 132 | 106 | 2.42 | 116 | 37.8 | 270 | 92.2% | 4.5 | 154 |
| E4 | 2 | 132 | 139 | 2.94 | 142 | 44.5 | 251 | 85.7% | 5.7 | 154 |
| E5 | 2 | 132 | 168 | 3.06 | 149 | 45.8 | 270 | 92.0% | 10.2 | 153 |
| E6 | 2 | 132 | 194 | 3.27 | 146 | 51.6 | 261 | 88.9% | 12.6 | 151 |
| E7 | 3 | 132 (132) | 136 | 2.89 | 128 | 50.9 | 281 | 95.7% | 3.7 | 154 |
| E8 | 3 | 132 (132) | 164 | 2.75 | 128 | 45.8 | 268 | 91.5% | 4.2 | 153 |
| E9 | 3 | 132 (132) | 178 | 3.01 | 135 | 55.4 | 273 | 93.0% | 5.9 | 153 |
| E10 | 3 | 132 (132) | 132 | 2.98 | 138 | 43.9 | 268 | 91.5% | 6.1 | 152 |
| E11 | 3 | 132 (132) | 152 | 3.19 | 144 | 46.9 | 266 | 90.6% | 5.8 | 155 |
| E12 | 3 | 132 (132) | 156 | 2.92 | 137 | 49.6 | 269 | 91.6% | 5.9 | 154 |
| E13 | 3 | 132 (132) | 150 | 3.15 | 124 | 54.0 | 262 | 89.2% | 8.6 | 153 |
| E14 | 2 | 124 | 119 | 3.32 | 142 | 40.7 | n.d. | n.d. | 10.4 | n.d. |
| E15 | 2 | 124 | 116 | 3.38 | 139 | 43.2 | n.d. | n.d. | 8.1 | n.d. |
| E16 | 2 | 124 | 118 | 3.22 | 132 | 41.4 | n.d. | n.d. | 8.5 | n.d. |
| E17 | 2 | 124 | 114 | 3.44 | 140 | 44.6 | n.d. | n.d. | 8.6 | n.d. |
| E18 | 2 | 124 | 113 | 3.73 | 137 | 53.4 | n.d. | n.d. | 14.3 | n.d. |
| E19 | 2 | 124 | 72 | 3.06 | 109 | 45.0 | n.d. | n.d. | 8.3 | n.d. |
| E20 | 2 | 134 | 88 | 3.06 | 118 | 41.8 | n.d. | n.d. | 7.4 | n.d. |
| E21 | 2 | 134 | 114 | 3.48 | 137 | 46.5 | n.d. | n.d. | 8.6 | n.d. |
| E22 | 2 | 134 | 142 | 3.77 | 149 | 50.1 | n.d. | n.d. | 14.8 | n.d. |
| E23 | 2 | 134 | 174 | 3.71 | 158 | 46.0 | n.d. | n.d. | 10.4 | n.d. |
| E24 | 2 | 134 | 196 | 3.81 | 160 | 47.6 | n.d. | n.d. | 17.9 | n.d. |
| E25 | 2 | 134 | 221 | 3.72 | 152 | 48.0 | n.d. | n.d. | 11.0 | n.d. |
| E26 | 2 | 136 | 67 | 2.48 | 92 | 47.2 | n.d. | n.d. | 4.3 | n.d. |
| E27 | 2 | 136 | 62 | 2.31 | 92 | 48.6 | n.d. | n.d. | 3.1 | n.d. |
| E28 | 2 | 136 | 113 | 2.99 | 115 | 51.6 | n.d. | n.d. | 6.8 | n.d. |
| E29 | 2 | 136 | 155 | 3.46 | 135 | 60.0 | n.d. | n.d. | 12.7 | n.d. |
| E30 | 2 | 136 | 96 | 2.35 | 97 | 44.6 | n.d. | n.d. | 3.2 | n.d. |
| E31 | 2 | 136 | 151 | 3.14 | 137 | 53.8 | n.d. | n.d. | 6.5 | n.d. |
| E32 | 2 | 136 | 132 | 3.06 | 120 | 52.0 | n.d. | n.d. | 5.5 | n.d. |
| E33 | 2 | 136 | 142 | 3.60 | 146 | 66.2 | n.d. | n.d. | 12.0 | n.d. |
| E34 | 2 | 136 | 116 | 2.97 | 133 | 42.8 | n.d. | n.d. | 6.6 | n.d. |
| E35 | 2 | 136 | 243 | 3.08 | 156 | 50.2 | n.d. | n.d. | 6.7 | n.d. |
| E36 | 2 | 136 | 122 | 3.16 | 122 | 54.9 | n.d. | n.d. | 7.5 | n.d. |
| E37 | 2 | 136 | 162 | 3.18 | 130 | 52.3 | n.d. | n.d. | 6.8 | n.d. |
| E38 | 2 | 136 | 131 | 3.26 | 129 | 51.7 | n.d. | n.d. | 9.2 | n.d. |
| E39 | 2 | 136 | 137 | 3.16 | 141 | 52.7 | n.d. | n.d. | 7.3 | n.d. |
| E40 | 2 | 136 | 120 | 2.93 | 107 | 51.5 | n.d. | n.d. | 5.2 | n.d. |
| E41 | 3 | 136 (138) | 162 | 2.96 | 149 | 48.6 | n.d. | n.d. | 5.8 | n.d. |
| E42 | 3 | 136 (138) | 235 | 3.05 | 168 | 53.5 | n.d. | n.d. | 6.5 | n.d. | n.d. = not determined

TABLE 2

| Stretched Sample | Stretching steps | Temp. at second drawing (° C.) | Temp. at third drawing (° C.) | Total Stretching Ratio | Tensile Strength (GPa) | Tensile Modulus (GPa) | TEB (J/g) | Heat of Fusion (J/g) | DSC crystallinity | Uniplanar Orientation Parameter Φ ( ) | Unconstrained melting temperature (° C.) |
|---|---|---|---|---|---|---|---|---|---|---|---|
| CE1  | 2 | 153 | —   | 53.6  | 1.43 | 73.2  | 16.9 | 250 | 85%  | 1.04 | 147.0 |
| CE2  | 2 | 154 | —   | 52.8  | 1.37 | 71.4  | 16.1 | 233 | 80%  | 1.18 | 148.8 |
| CE3  | 2 | 154 | —   | 51.4  | 1.40 | 70.8  | 18.9 | 264 | 90%  | 1.61 | 149.2 |
| CE4  | 2 | 155 | —   | 53.2  | 1.25 | 50.2  | 17.1 | 222 | 76%  | 1.02 | 151.2 |
| CE5  | 2 | 154 | —   | 52.4  | 1.45 | 73.1  | 18.1 | 243 | 83%  | 2.02 | 149.0 |
| CE6  | 2 | 155 | —   | 51.3  | 1.27 | 64.7  | 15.3 | 210 | 72%  | 2.09 | 148.9 |
| CE7  | 3 | 153 | 154 | 101.1 | 1.81 | 103.3 | 19.2 | 272 | 93%  | 1.23 | 149.6 |
| CE8  | 3 | 153 | 155 | 101.1 | 1.86 | 96.8  | 22.0 | 256 | 87%  | 1.33 | 148.2 |
| CE9  | 3 | 153 | 156 | 102.5 | 0.97 | 44.9  | 11.8 | 171 | 58%  | 0.98 | 150.9 |
| CE10 | 3 | 154 | 154 | 100.7 | 1.94 | 102.8 | 22.8 | 270 | 92%  | 1.29 | 148.4 |
| CE11 | 3 | 154 | 155 | 102.2 | 1.84 | 96.2  | 20.9 | 262 | 89%  | 1.17 | 149.1 |
| CE12 | 3 | 154 | 156 | 107.1 | 0.91 | 42.5  | 11.7 | 173 | 59%  | 0.88 | 149.9 |
| CE13 | 3 | 154 | 154 | 99.7  | 1.86 | 104.1 | 20.0 | 263 | 90%  | 1.74 | 148.0 |
| CE14 | 3 | 154 | 155 | 99.7  | 1.95 | 102.4 | 22.3 | 263 | 90%  | 1.86 | 148.5 |
| CE15 | 3 | 154 | 156 | 99.6  | 1.09 | 53.2  | 13.3 | 211 | 72%  | 1.36 | 150.0 |
| CE16 | 3 | 155 | 154 | 100.7 | 1.81 | 95.3  | 21.5 | 240 | 82%  | 1.36 | 150.8 |
| CE17 | 3 | 155 | 155 | 99.0  | 1.65 | 81.0  | 20.4 | 216 | 74%  | 1.25 | 150.9 |
| CE18 | 3 | 155 | 156 | 104.4 | 1.45 | 70.1  | 19.2 | 206 | 70%  | 1.36 | 151.4 |
| CE19 | 3 | 154 | 154 | 100.0 | 1.81 | 98.2  | 19.1 | 245 | 83%  | 1.88 | 148.8 |
| CE20 | 3 | 154 | 155 | 100.7 | 1.80 | 96.2  | 19.9 | 265 | 90%  | 1.92 | 151.4 |
| CE21 | 3 | 154 | 156 | 102.8 | 1.29 | 66.0  | 16.0 | 222 | 76%  | 1.64 | 150.9 |
| CE22 | 3 | 155 | 155 | 98.8  | 1.84 | 97.5  | 21.9 | 238 | 81%  | 2.32 | 150.7 |
| CE23 | 3 | 155 | 156 | 96.8  | 1.48 | 77.2  | 19.5 | 203 | 69%  | 2.00 | 151.7 |
| CE24 | 3 | 154 | 154 | 112.7 | 1.72 | 105.1 | 19.7 | 262 | 89%  | 1.90 | 148.8 |
| CE25 | 3 | 154 | 154 | 131.9 | 1.72 | 113.8 | 19.6 | n.d. | n.d. | 2.42 | n.d. |
| CE26 | 3 | 154 | 154 | 149.0 | 1.72 | 123.0 | 19.5 | n.d. | n.d. | 2.71 | n.d. |
| CE27 | 3 | 154 | 154 | 168.0 | 1.86 | 131.0 | 19.7 | n.d. | n.d. | 3.01 | n.d. |

As can be seen from Table 2, the use of a polymer with a Mw/Mn ratio of more than 6 and an elastic shear modulus determined directly after melting at 160° C. of more than 0.9 MPa results in a material with a tensile strength and TEB which are well outside the range of the present invention. It is noted that in these Examples the films were stretched as far as they would go. It was not possible to obtain higher stretching ratios.

The invention claimed is:

1. UHMWPE film having a tensile strength of at least 2.0 GPa, a tensile energy to break of at least 30 J/g, an Mw of at least 500 000 gram/mole, a Mw/Mn ratio of at most 6, a modulus of at least 100 GPa, and an organic solvent content of less than 100 ppm, wherein the UHMWPE film is obtained by a solid state process, and wherein the UHMWPE film has a uniplanar orientation parameter of at least 3.

2. The UHMWPE film of claim 1 which has a tensile strength of at least 2.5 GPa.

3. The UHMWPE film of claim 1 which has a tensile energy to break of at least 35 J/g.

4. The UHMWPE film of claim 1 which has a Mw/Mn ratio of at most 4.

5. A process for manufacturing the UHMWPE film according to claim 1 which comprises subjecting a starting UHMWPE with a weight average molecular weight of at least 500 000 gram/mole, an elastic shear modulus determined directly after melting at 160° C. of at most 0.9 MPa, and a Mw/Mn ratio of at most 6 to a compacting step and a stretching step under such conditions that at no point during the processing of the polymer its temperature is raised to a value above its melting point, wherein the process is carried out in the solid state.

6. The process of claim 5 wherein the starting UHMWPE has an elastic shear modulus determined directly after melting at 160° C. of at most 0.8 MPa.

7. The process of claim 5 wherein the compacting step is carried out at a temperature of at least 1° C. below the unconstrained melting point of the polymer and the stretching step is carried out at a temperature of at least 1° C. below the melting point of the polymer under process conditions.

8. The process of claim 5 wherein the total stretching ratio obtained is at least 120.

9. A method of manufacturing ballistic applications, ropes, cables, nets, fabrics, and protective applications comprising providing the UHMWPE film or converted products thereof of claim 1 as a starting material.

10. Ballistic attributes, ropes, cables, and nets, fabrics, and protective appliances manufactured using the UHMWPE film according to claim 1.

* * * * *